United States Patent
Lecha

(10) Patent No.: US 8,031,695 B2
(45) Date of Patent: Oct. 4, 2011

(54) HDLC ENCODING AND DECODING TECHNIQUES

(75) Inventor: Eduard Lecha, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 1607 days.

(21) Appl. No.: 10/839,529

(22) Filed: May 4, 2004

(65) Prior Publication Data

US 2005/0249189 A1 Nov. 10, 2005

(51) Int. Cl.
*H04L 12/66* (2006.01)
*H04J 3/00* (2006.01)

(52) U.S. Cl. ......................... 370/352; 370/476

(58) Field of Classification Search .................. 370/503, 370/504, 505, 413, 416, 352, 476; 375/240.02
See application file for complete search history.

(56) References Cited

U.S. PATENT DOCUMENTS

| | | | |
|---|---|---|---|
| 5,541,919 A * | 7/1996 | Yong et al. ..................... | 370/416 |
| 6,859,465 B1 * | 2/2005 | Colban .......................... | 370/506 |
| 7,099,352 B1 * | 8/2006 | Ferguson et al. ............. | 370/504 |
| 7,227,844 B1 * | 6/2007 | Hall et al. ..................... | 370/242 |
| 7,388,912 B1 * | 6/2008 | Katsavounidis et al. ......................... | 375/240.02 |
| 7,496,109 B1 * | 2/2009 | Gupta et al. .................. | 370/413 |
| 2002/0176449 A1 * | 11/2002 | Trippe .......................... | 370/505 |
| 2003/0185239 A1 * | 10/2003 | Miller et al. .................. | 370/474 |
| 2003/0200330 A1 * | 10/2003 | Oelke et al. ................... | 709/238 |
| 2004/0085897 A1 * | 5/2004 | Jacobi et al. .................. | 370/229 |
| 2004/0120322 A1 * | 6/2004 | Wu ............................... | 370/395.4 |
| 2004/0208120 A1 * | 10/2004 | Shenoi .......................... | 370/229 |

OTHER PUBLICATIONS

Simpson, W., "PPP in HDLC-like Framing", memo to Network Working Group of The Internet Society (Jul. 1994).
Malis, A. and Simpson, W., "PPP over SONET/SDH", memo to Network Working Group of The Internet Society (Jun. 1999).
American National Standards Institute, "Information technology—Telecommunications and information exchange between systems—High-level data link control (HDLC) procedures—Frame structure", ISO/IEC International Standard, reference No. ISO/IEC 3309:1993(E) (Dec. 12, 1993).
International Telecommunication Union, Telecommunication Standardization Sector (ITU-T), "Ethernet over LAPS", document No. X.86 (Feb. 2001).
International Telecommunication Union, Telecommunication Standardization Sector (ITU-T), "Ethernet over LAPS—Amendment 1: Using Ethernet Flow Control as Rate Limiting", document No. X.86/Y1323—Amendment 1 (Apr. 2002).
International Telecommunication Union, Telecommunication Standardization Sector (ITU-T), "IP Over SDH Using LAPS", document No. X.85/Y1321 (Mar. 2001).

* cited by examiner

*Primary Examiner* — Ahmad F Matar
*Assistant Examiner* — Sonia Gay
(74) *Attorney, Agent, or Firm* — Caven & Aghevli LLC

(57) ABSTRACT

An HDLC frame formation technique that calculates fields based on unscrambled data and combines unscrambled fields with scrambled data. Decoding HDLC frames includes determining integrity of the scrambled data based on the unscrambled fields.

27 Claims, 12 Drawing Sheets

Transmit direction

Receive direction

HDLC ENCODING AND DECODING TECHNIQUES

DESCRIPTION OF THE ART

Networks such as the Internet, Local Area Networks (LANs), and Wide Area Networks (WANs) typically transmit data between devices via frames of data. Networked devices may transmit data using Synchronous Optical Network/Synchronous Digital Hierarchy (SONET/SDH) or Packet Over SONET (POS) protocols. Internet Protocol (IP) packets can be encapsulated into Point-to-Point Protocol (PPP) frames that can be further encapsulated into High-level Data Link Control (HDLC) frames. HDLC frames can further be mapped into SONET/SDH frames. Encapsulation of data into HDLC frames and encapsulation of HDLC frames into SONET frames is specified by the Internet Engineering Task Force (IETF) in "PPP in HDLC-like Framing", RFC 1662, published July 1994; "PPP over SONET/SDH", RFC 2615, published June 1999; "IP Over SDH Using LAPS", International Telecommunication Union (ITU)-T X.85, published March 2000; High-level Data Link Control (HDLC), International Organization for Standardization/International Electrotechnical Convention (ISO/IEC) 3309, published Jun. 1, 1991; as well as ITU-T X.86 Y.1323, Ethernet over LAPS, February 2001.

FIG. 1 shows data-flow for HDLC byte-oriented processing in both transmit and receive directions. When mapping IP packets into a SONET/SDH payload according to IETF RFC 2615 and ITU-T LAPS X.85 (Packet-Over-SONET) or when mapping Ethernet frames into SONET/SDH payload (as per ITU-T LAPS X.86), data is scrambled after being processed for HDLC byte-oriented delineation. Scrambling prevents long sequences of zeroes that could cause loss of clock on the receiver side of an optical line. One drawback of HDLC byte-oriented frame delineation is the potential loss of bandwidth when the data to be delineated contains the same control characters that are used by the delineation mechanism (e.g., 7E and 7D). Such characters in the data are stuffed (7E is converted to 7D-5E and 7D is converted to 7D-5D) in order to be distinguished from characters performing delineation functions that are not part of the data.

In order to make uniform the impact of stuffing and prevent a malicious user from slowing down a link by sending packets full of control characters (7E or 7D), user data may be scrambled before byte stuffing. Scrambling user data before byte stuffing is called pre-HDLC scrambling. Scrambling user data before byte-stuffing can be applied before or after Frame Check Sequence (FCS) field insertion.

FIG. 2 depicts a processing flow for a pre-HDLC scrambler on the transmission side to encode HDLC frames for transmission. FIG. 2 also depicts a processing flow on the receive side to decode received HDLC frames. In this example, on the transmission side, the pre-HDLC scrambler receives a packet and scrambles the packet. In this example, Frame Check Sequence (FCS) calculations are made based on a scrambled payload. The FCS calculator and inserter calculates the FCS on the scrambled packet and combines the FCS with the scrambled packet. For example, byte stuffer replaces control characters, such as 7D and 7E (specified in POS), with a two byte sequence 7D-7E or 7D-5D. The flag inserter inserts one of more control characters (0×7E) to separate (delineate) HDLC frames.

On the receive side, the frame delineator separates HDLC frames from one another. Byte de-stuffer transforms byte sequences back into control characters. FCS checker checks the validity of the FCS value prior to the packet being unscrambled by the descrambler. One drawback of the approach in FIG. 2 is in the receive direction, an error in one packet may be propagated to a next packet. The descrambler will propagate an error from a first packet to a second packet and a check of the second packet's FCS will not detect the error in the second packet because the FCS is checked before descrambling. For example, referring to FIG. 3, if an error is present in a first received packet (packet 1), the error in the first received packet (packet 1) may be propagated to a second received packet (packet 2) and such error in packet 2 may go undetected.

FIG. 4 depicts a processing flow for a pre-HDLC scrambler on the transmission side to encode HDLC frames as well as a processing flow on the receive side to decode HDLC frames. On the transmission side, FCS calculator and inserter calculates the FCS based on unscrambled user data and combines the FCS with the unscrambled user data. The scrambler scrambles the FCS value together with user data. In this example, byte stuffer and flag insertion perform similar actions as those described earlier. A drawback of this approach is that in the transmit direction, the expansion of data from byte-stuffing cannot be known before FCS has been calculated and a "back-pressure" mechanism is typically implemented to control a rate of data-flow to prevent overflow. This implementation also requires storage resources to accumulate bits between every stage.

On the receive side, received user data and FCS may be unscrambled prior to the FCS portion being checked for validity. In this receive side processing, unlike in the example of FIG. 2, a transmission error propagated by the descrambler from a first received packet to the second received packet would be detected in the FCS check.

DETAILED DESCRIPTION

Figure 1:
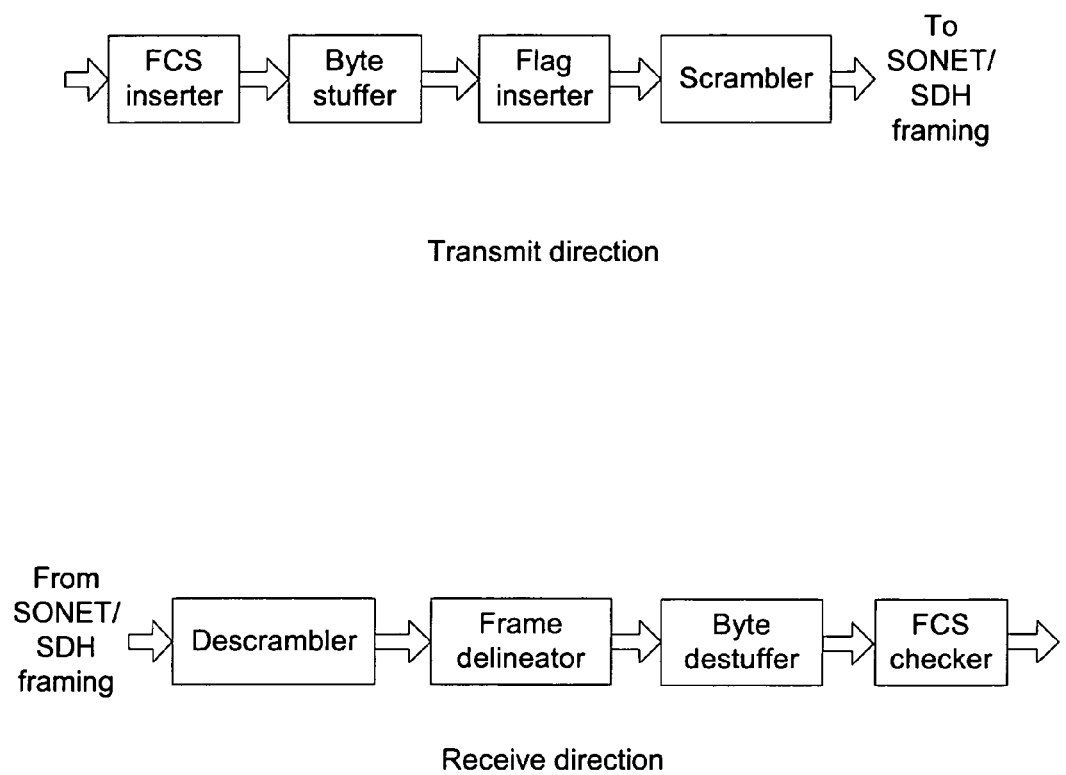
FIG. 1 shows data-flow in a HDLC byte-oriented frame delineation process in both transmit and receive directions.
Figure 2:
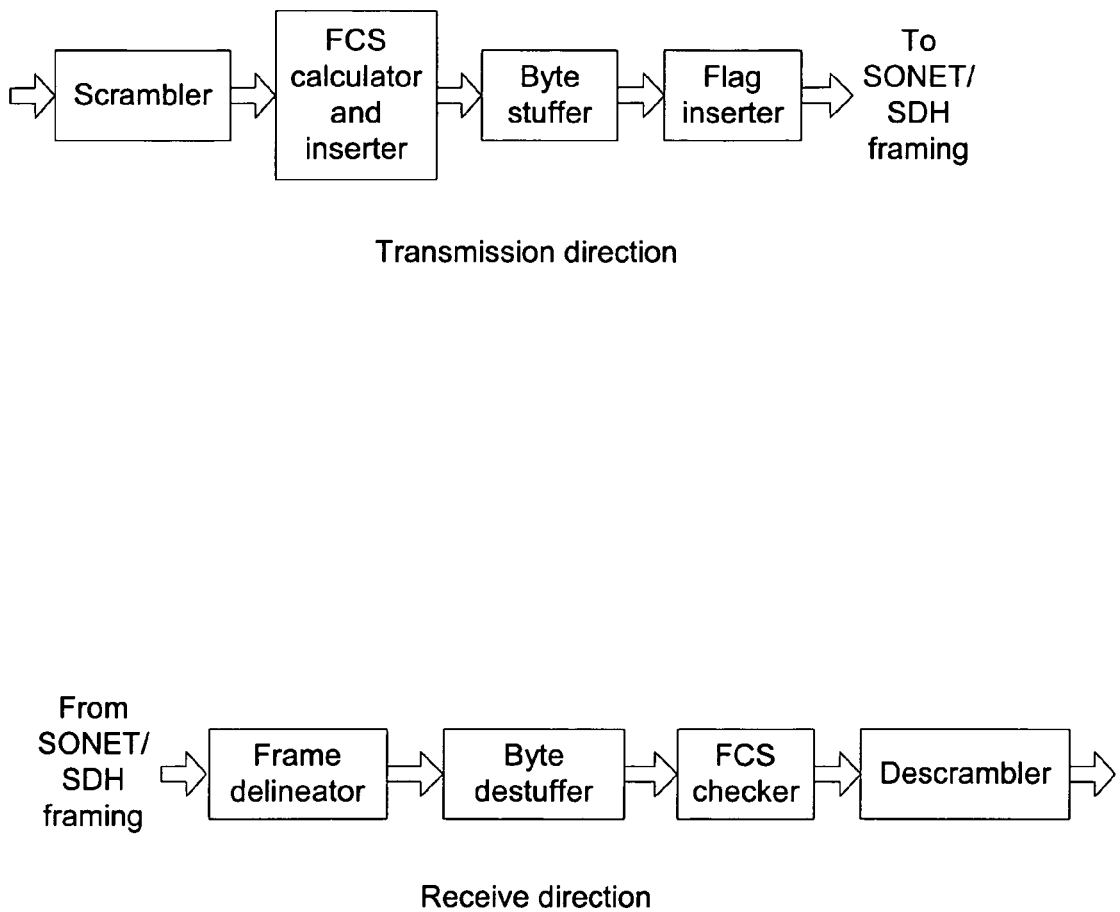
FIG. 2 depicts a processing flow for a pre-HDLC scrambler on the transmission side as well as a processing flow on the receive side to decode transmitted HDLC frames.
Figure 3:
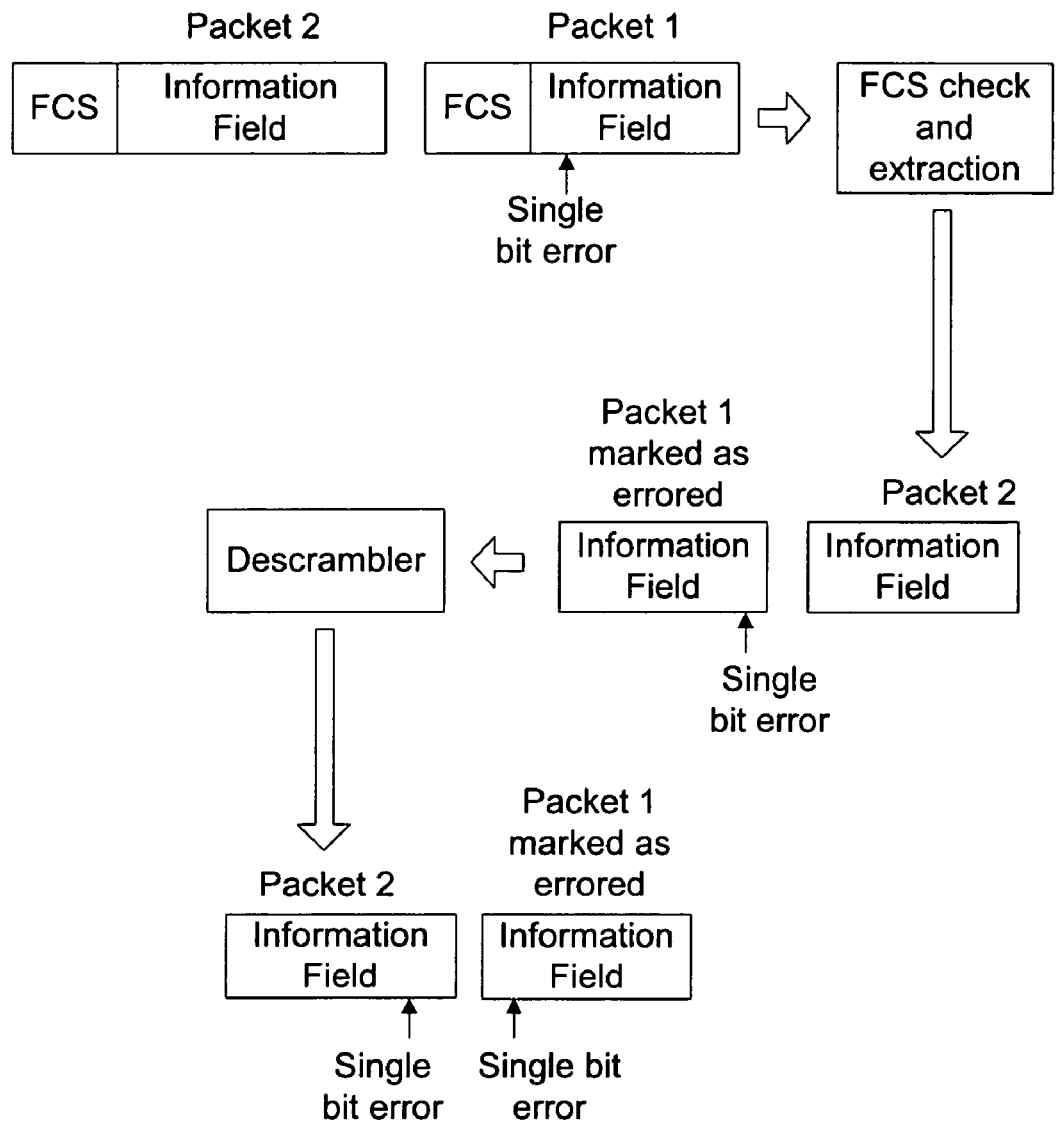
FIG. 3 depicts an example of an error propagation.
Figure 4:
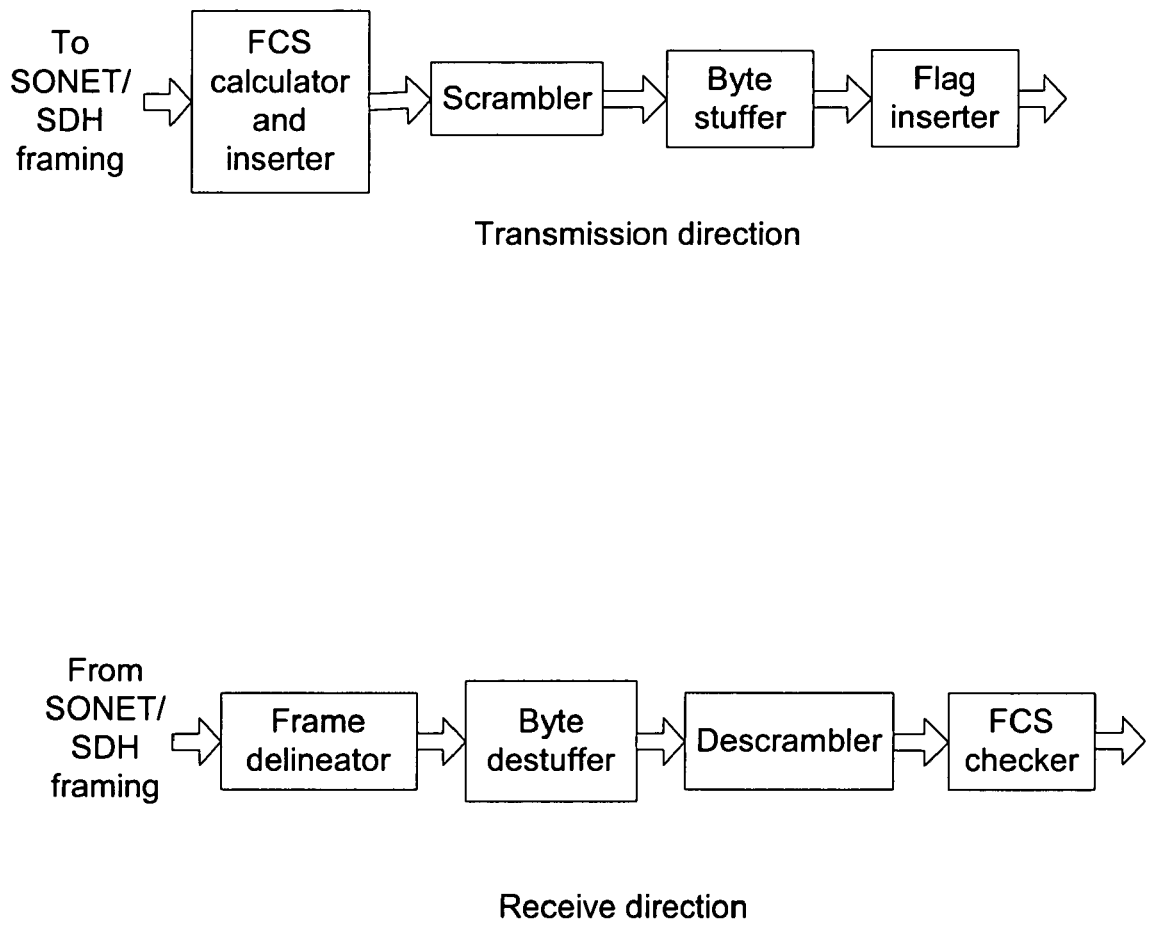
FIG. 4 depicts a processing flow for a pre-HDLC scrambler on the transmission side to encode HDLC frames as well as a processing flow on the receive side to decode HDLC frames.
Figure 5:
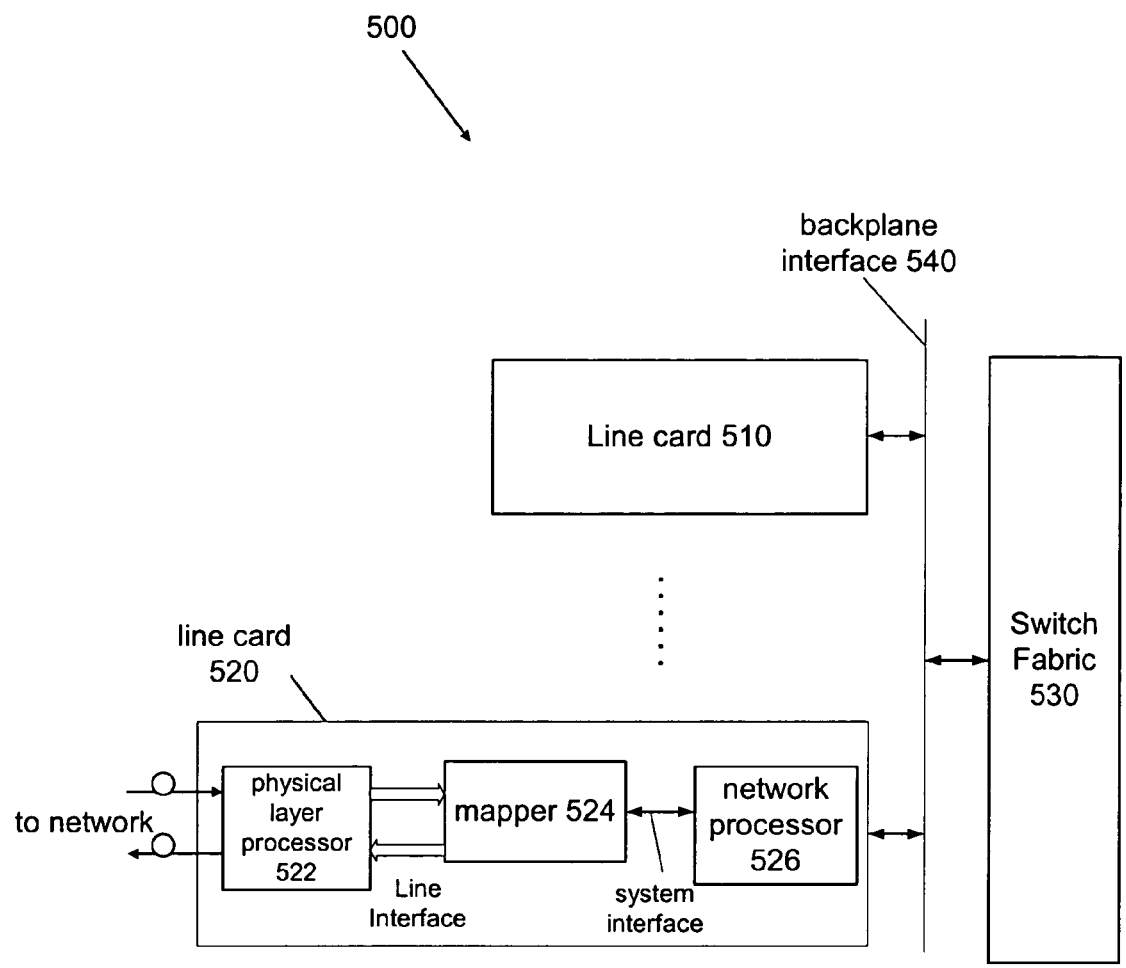
FIG. 5 depicts a suitable system embodiment in accordance with an embodiment of the present invention.

FIG. 5 depicts a suitable system embodiment in accordance with an embodiment of the present invention. System 500 may include line card 510, line card 520, switch fabric 530, and backplane interface 540. Line card 510 may be implemented as a SONET/SDH add-drop multiplexer, a Fibre Channel compatible line input, an Ethernet line input or a SONET/SDH line input.

Line card 520 may be implemented as a transceiver capable of transmitting and receiving frames to and from a network that is compatible with SONET/SDH. For example, the network may be any network such as the Internet, an intranet, a local area network (LAN), storage area network (SAN), a wide area network (WAN). One implementation of line card 520 may include physical layer processor 522, mapper 524, and network processor 526.

Physical layer processor 522 may receive optical or electrical signals from the network and prepare the signals for processing by downstream elements such as mapper 524. For example, physical layer processor 522 may convert optical signals to electrical format and/or remove jitter from signals from the network. For frames to be transmitted to the network, physical layer processor 522 may remove jitter from signals provided by upstream devices such as mapper 524 and prepare signals for transmission to the network, which may be optical or electrical format.

To prepare frames for transmission to a network, mapper 524 may construct HDLC frames at least from IP packets and/or Ethernet frames. Mapper 524 may utilize embodiments of the present invention to build HDLC frames. Further, mapper 524 may construct SONET/SDH frames from HDLC frames and overhead.

For SONET/SDH packets received from a network, mapper 524 may decode HDLC frames to extract IP packets and Ethernet frames (as well as other user data and other information). To decode HDLC frames, mapper 524 may use embodiments of the present invention. Mapper 524 may transfer IP packets and Ethernet frames (as well as other user data) to a higher layer level processor such as a network processor 526. For example, mapper 524 and network processor 526 may intercommunicate using an interface compatible for example with SPI-4.

Network processor 526 may perform layer 2 or layer 3 (as well as other higher layer level) processing on IP packets and Ethernet frames (as well as other user data and other information) provided by and to mapper 524 in conformance with applicable link, network, transport and application protocols. Network processor 526 also may perform traffic management at the IP layer.

In one implementation, components of line card 520 may be implemented among the same integrated circuit. In another implementation, components of line card 520 may be implemented among several integrated circuits that intercommunicate using, for example, a bus or conductive leads of a printed circuit board.

Backplane interface 540 may be implemented as a single or multi-pin interface and may be used by line cards to interface with switch fabric 530. Switch fabric 530 may transfer IP packets or Ethernet packets (as well as other information) between line cards based on relevant address and header information.

Figure 6A:
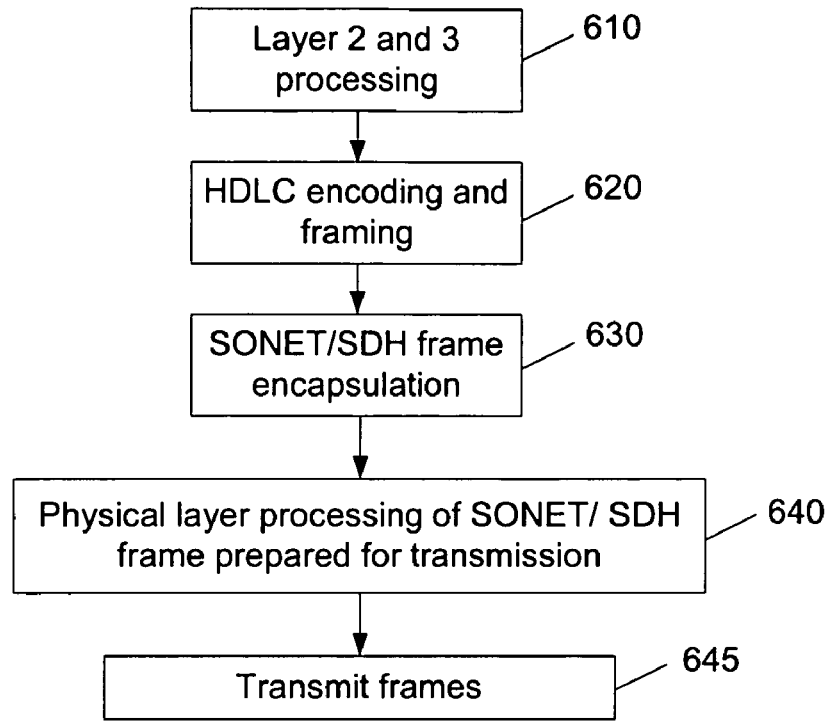
FIG. 6A depicts a flow diagram of one possible manner in which a line card processes packets and frames for transmission as SONET/SDH frames.

FIG. 6A depicts a flow diagram of one possible manner in which line card 520 processes packets and frames (as well as other user data and other information) for transmission as SONET/SDH frames. Action 610 of FIG. 6A may include performing layer 2 and layer 3 processing on IP packets and Ethernet frames in conformance with layer 2 and layer 3 protocols. Action 620 may include performing HDLC encoding and framing of IP packets and Ethernet frames (or other types of user data and information) in conformance with HDLC standards. Action 620 may utilize embodiments of the present invention. Action 630 may include performing SONET/SDH frame encapsulation of HDLC frames in preparation to transmit such SONET/SDH frames. Action 640 may include performing physical layer processing on the SONET/SDH frames. Action 645 may include transmitting SONET/SDH frames to a network medium such as a fiber optic cable or other medium.

Figure 6B:
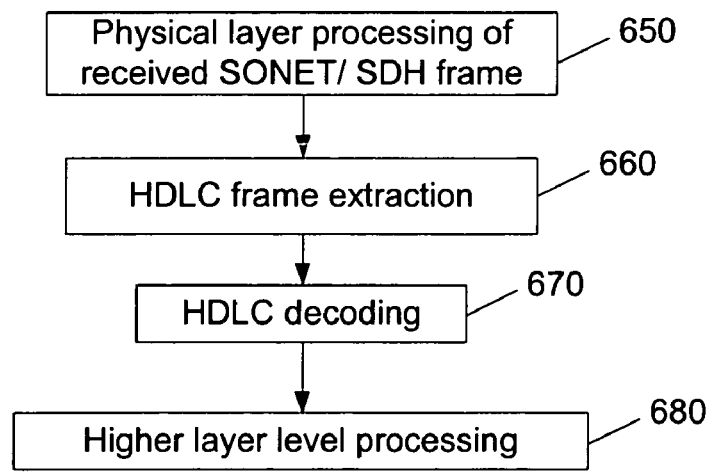
FIG. 6B depicts one possible manner in which a line card may process SONET/SDH frames received from a network.

FIG. 6B depicts one possible manner in which line card 520 may process SONET/SDH frames received from a network. Action 650 of FIG. 6B may include receiving a SONET/SDH frame from a network medium and performing physical layer processing on the received SONET/SDH frame. Action 660 may include extracting HDLC frames from the SONET/SDH frame. Action 670 may include HDLC decoding and extracting IP packets and Ethernet frames (as well as other types of user data and information) from HDLC frames. Action 670 may utilize embodiments of the present invention. Action 680 may include performing higher layer processing (e.g., layer 2 and layer 3) on IP packets and Ethernet frames (as well as other types of user data and information) in conformance with layer 2 and layer 3 protocols. Action 680 may further include traffic management of received IP packets and Ethernet frames (and other types of user data).

Figure 7:
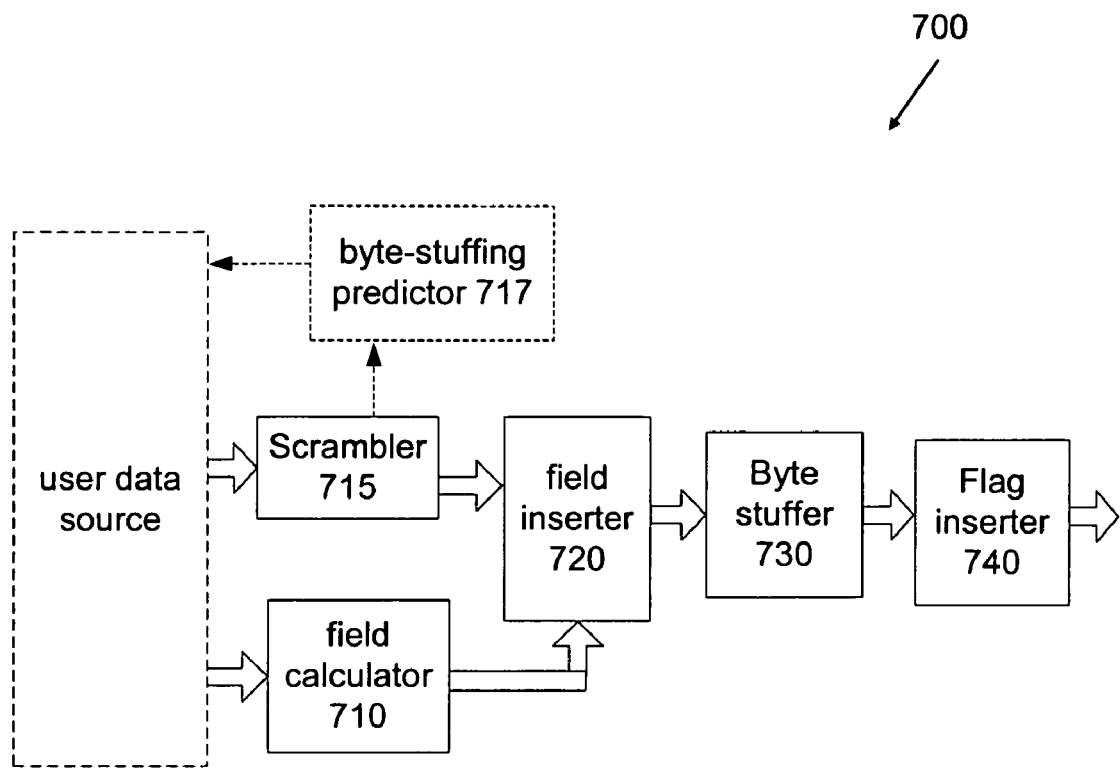
FIG. 7 depicts an HDLC encoder in accordance with an embodiment of the present invention.

FIG. 7 depicts an HDLC encoder 700 in accordance with an embodiment of the present invention, although other implementations may be used. One implementation of HDLC encoder 700 may include field calculator 710, scrambler 715, field inserter 720, byte stuffer 730, and flag inserter 740. HDLC encoder 700 may receive IP packets and Ethernet frames (as well as other information such as PPP, Fibre Channel or Resilient Packet Ring packets) from a user data source such as, but not limited to, a system interface that intercommunicates with an upper-layer processing device such as a network processor. HDLC encoder 700 may build HDLC frames using IP packets and Ethernet frames (as well as other information such as PPP, Fibre Channel or Resilient Packet Ring packets). HDLC frames may be used to build SONET/SDH frames. In one implementation, IP packets may be encapsulated into PPP frames first and then encapsulated into HDLC frames.

Field calculator 710 may calculate fields based on the received IP packets and Ethernet frames (as well as other information such as PPP, Fibre Channel or Resilient Packet Ring packets). For example, field calculator 710 may determine the FCS field as well as an HDLC frame header in conformance with HDLC standards. Under POS, the FCS field may be 16 or 32 bits, however other number of bits may be used. Field calculator 710 may use a linear feedback shift register (LFSR) or a look-up-table to determine the FCS value based on intended contents of an HDLC frame.

Scrambler 715 may scramble the IP packets and Ethernet frames as well as other user data contents of an HDLC frame except for any FCS field or other specified field(s). Scrambler 715 may perform scrambling in conformance with ITU-T LAPS X.85 (Packet-Over-SONET) and relevant IETF RFCs.

Figure 8:
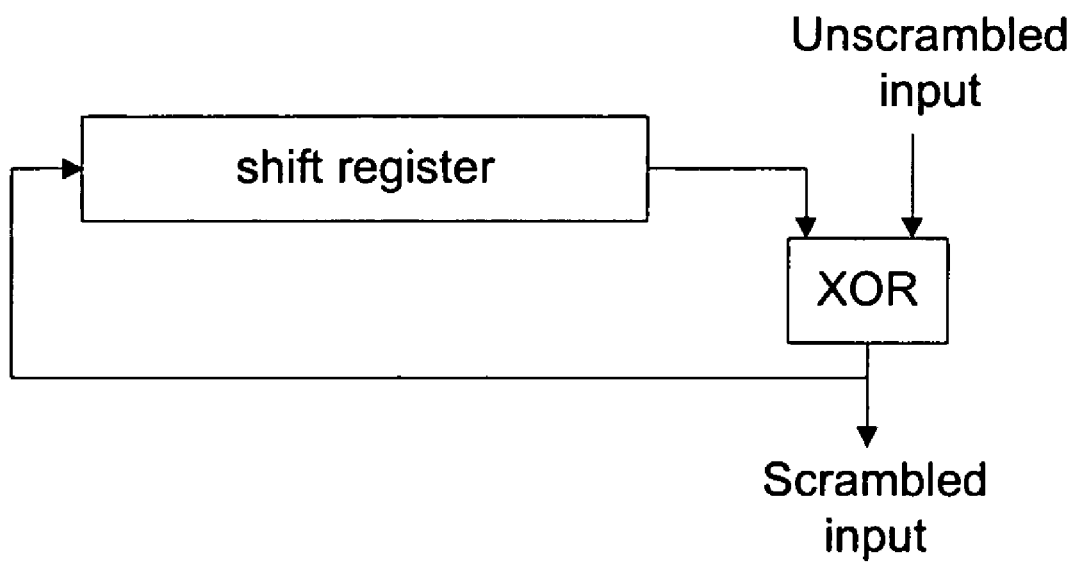
FIG. 8 depicts one possible implementation of a scrambler in accordance with an embodiment of the present invention.

FIG. 8 depicts one possible implementation of a scrambler although other implementations may be used. The scrambler may include a shift register and an XOR logical device. Each bit of a scrambled signal provided by the scrambler may be a result of an XOR operation between a bit from the shift register and a bit from the unscrambled input. For example, the shift register may be implemented a 43 bit serial shift register, although other numbers of bits may be used. For the first packet, the shift register may be initialized to all zeros. The contents of the shift register at the beginning of the scrambling operation for the second packet is the contents of the scrambler after scrambling the first packet.

One advantage, although not a necessary feature or aspect, of one embodiment of the present invention, is that providing scrambling before byte stuffing may reduce the likelihood of byte stuffing in byte stuffer 730 and thereby may reduce the likely size of a stuffed HDLC frame.

One advantage, although not a necessary feature or aspect, of one embodiment of the present invention is that the number of bytes stuffed for each HDLC frame may be predicted after scrambler 715 scrambles user data. For example, scrambler 715 may provide each user data byte to a byte-stuffing predictor 717 that counts 7D and 7E characters (or other characters that are to be replaced with stuff characters) and can thereby predict the number of bytes that will be added by byte stuffer 730. In one implementation, the number of bytes that will be stuffed can be predicted before FCS field calculation, although other implementations may differ. The byte-stuffing predictor 717 can signal back to a source of traffic to HDLC encoder 700 to slow down or speed up user data traffic. Accordingly, one advantage, but not a necessary feature, of an embodiment of the present invention is a likelihood of overflow (i.e., more bytes generated during the data path of HDLC encoder 700 than the data path can handle) may be reduced. One advantage, but not a necessary feature, of an embodiment of the present invention is that to the extent memory/overflow devices (not depicted) are provided between stages of HDLC encoder 700 to accommodate overflow, less memory storage capability may be used.

Field inserter 720 may add the unscrambled field(s) determined by field calculator 710 to the scrambled user data portion from scrambler 715. For example, one possible location to add an unscrambled header is at the beginning of an HDLC frame. For example, one possible location to add an unscrambled FCS field is to the end of an HDLC frame.

Byte stuffer 730 may perform byte stuffing in conformance with HDLC standards. For example, byte stuffer 730 may replace control characters (such as 7D and 7E) with two-byte sequences (such as 7D-7E and 7D-5D, respectively). Other control characters may be modified or replaced with other characters.

Flag inserter 740 may insert one of more control characters (e.g., 0×7E) to delineate each HDLC frame in conformance with HDLC standards (in particular, byte-oriented HDLC). Thereafter, a mapper may map HDLC frames into payload of a SONET/SDH frame(s).

Figure 9:
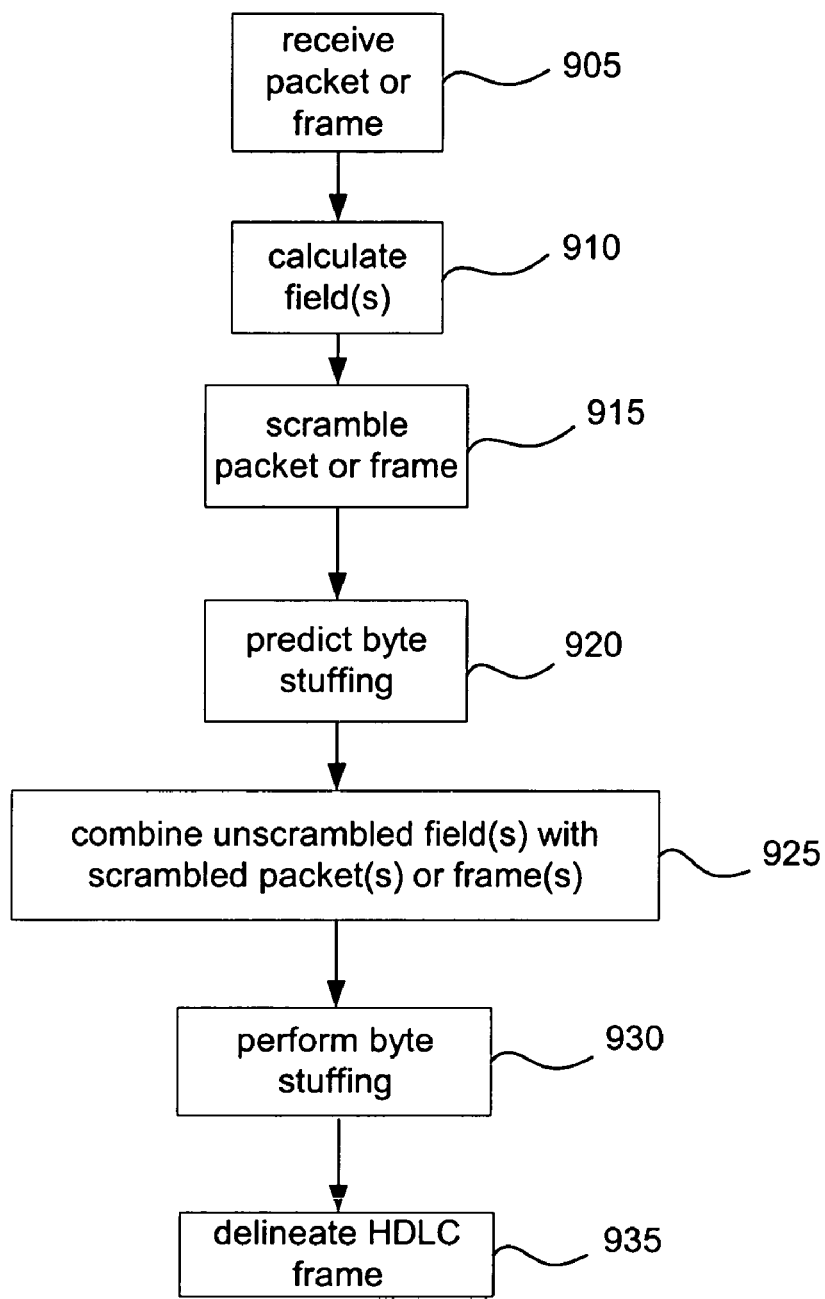
FIG. 9 depicts an example flow diagram of a process to encode HDLC frames in accordance with an embodiment of the present invention.

FIG. 9 depicts an example flow diagram of a process to encode HDLC frames in accordance with an embodiment of the present invention. Action 905 may include receiving an IP packet or Ethernet frame (as well as other information such as PPP, Fibre Channel or Resilient Packet Ring packets).

Action 910 may include calculating one or more fields based on the packet or frame received in action 905. For example, one field may be an FCS field. Another field may be an HDLC frame header.

Action 915 may include scrambling the packet(s), frame(s), and other information received in action 905 in conformance with ITU-T LAPS X.85 (Packet-Over-SONET) and relevant IETF RFCs.

Action 920 may include predicting byte stuffing for the current HDLC frame.

Action 925 may include combining the unscrambled fields determined in action 910 with the scrambled packet(s), frame(s), and other information from action 915.

Action 930 may include performing byte stuffing in each HDLC frame in conformance with the HDLC standards. For example, byte stuffing may replace control characters (such 7D and 7E) with other sequences (such as 7D-7E and 7D-5D, respectively). Action 935 may include inserting control characters to separate HDLC frames in conformance with HDLC.

Figure 10:
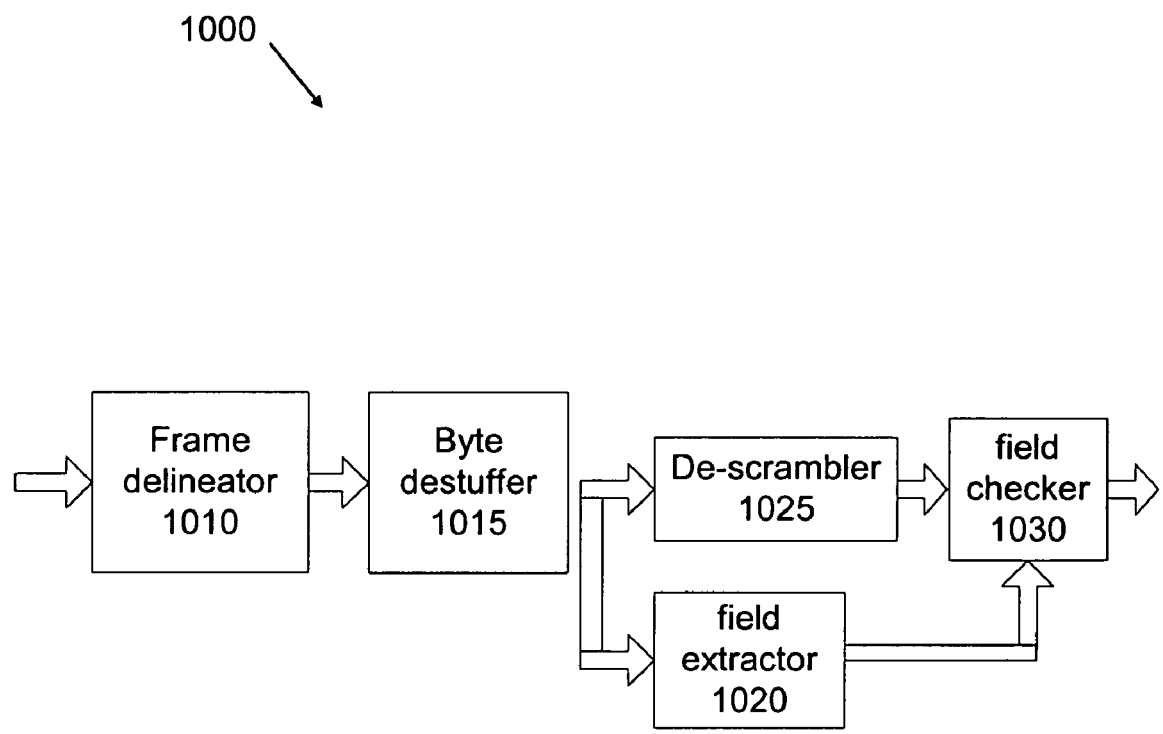
FIG. 10 depicts an HDLC decoder in accordance with an embodiment of the present invention.

FIG. 10 depicts an HDLC decoder 1000 in accordance with an embodiment of the present invention, although other implementations may be used. HDLC decoder 1000 may be used to extract user data (such as IP packets and Ethernet frames as well as other information such as PPP, Fibre Channel or Resilient Packet Ring packets) from HDLC frames. For example, HDLC frames may be transmitted in a SONET/SDH frame and provided by a mapper to the HDLC decoder 1000. One implementation of HDLC decoder 1000 may include frame delineator 1010, byte de-stuffer 1015, field extractor 1020, de-scrambler 1025, and field checker 1030.

Frame delineator 1010 may remove control characters (e.g., 0×7E) that separate HDLC frames from one another and provide each HDLC frame for further processing. Byte de-stuffer 1015 may transform replacement sequences, such as 7D-7E and 7D-5D, into control characters, such 7D and 7E.

Field extractor 1020 may remove unscrambled fields (such as the FCS field and other fields such as an HDLC frame header) from the HDLC frame.

Figure 11:
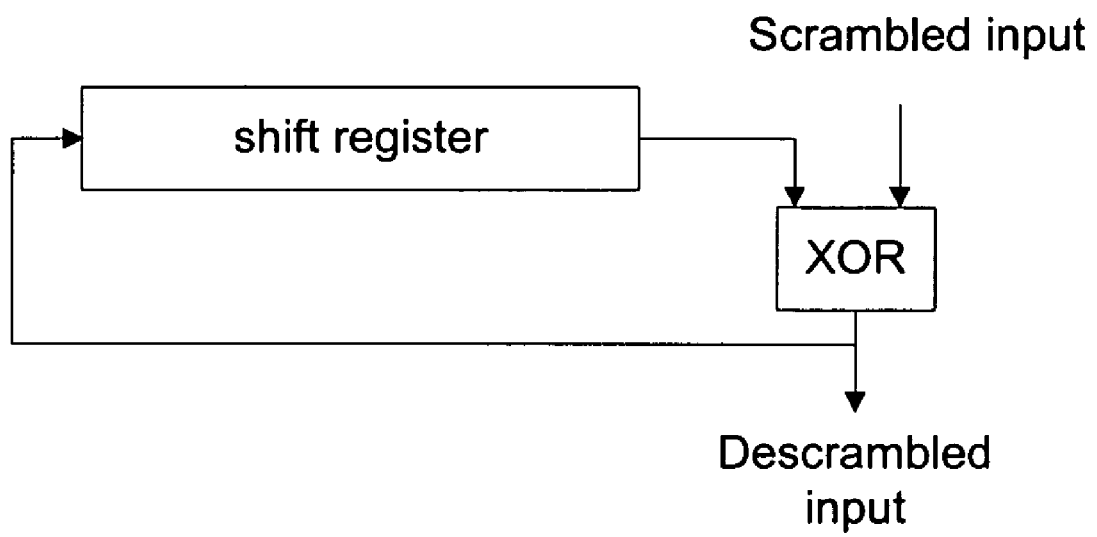
FIG. 11 depicts one possible implementation of a descrambler in accordance with an embodiment of the present invention.

De-scrambler 1025 may apply de-scrambling to the scrambled HDLC frame in conformance with ITU-T LAPS X.85 (Packet-Over-SONET) and relevant IETF RFCs except for the FCS field (and other fields) extracted by the field extractor 1020. FIG. 11 depicts one possible implementation of a descrambler although other implementations may be used. The descrambler may include a shift register and an XOR logical device. Each bit of a descrambled signal provided by the descrambler may be a result of an XOR operation between a bit from the shift register and a bit from the scrambled input. For example, the shift register may be implemented as a 43 bit serial shift register, although other numbers of bits may be used. For the first packet, the shift register may be initialized to all zeros. The contents of the shift register at the beginning of the descrambling operation for the second packet is the contents of the descrambler after descrambling the first packet.

Field checker 1030 may check whether the unscrambled field (e.g., FCS and/or HDLC frame header) is correct in conformance with HDLC standards. For example, field checker 1030 may determine an FCS value based on the descrambled HDLC frame and compare the FCS value against the extracted unscrambled FCS field. A transmission error propagated by the descrambler 1025 from one packet to a sequential packet may be avoided because of detection in the FCS check.

Figure 12:
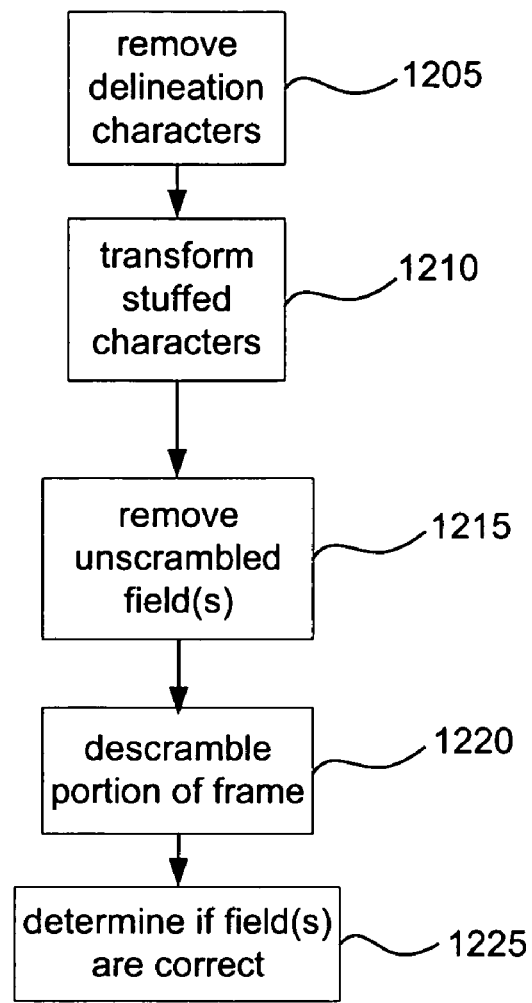
FIG. 12 depicts an example flow diagram of a process to decode HDLC frames in accordance with an embodiment of the present invention.

FIG. 12 depicts an example flow diagram of a process to decode HDLC frames in accordance with an embodiment of the present invention. The process of FIG. 12 may receive HDLC frames provided from the payload of a SONET/SDH frame. Action 1205 may include removing HDLC frame delineation characters from HDLC frames. For example, HDLC frame delineation characters (e.g., 0×7E) may define the boundaries of an HDLC frame.

Action 1210 may include transforming stuffed sequences, such as 7D-7E and 7D-5D, into control characters, such as 7D and 7E. Action 1215 may include removing unscrambled fields (such as the FCS field and other fields such as an HDLC frame header) from the HDLC frame.

Action 1220 may include apply de-scrambling to the scrambled HDLC frame in conformance with ITU-T LAPS X.85 (Packet-Over-SONET) and relevant IETF RFCs except for the FCS field (and other fields) extracted in action 1215.

Action 1225 may include determining whether the unscrambled FCS field is correct in conformance with IETF and ITU-T standards. For example, action 1225 may determine an FCS value based on the descrambled HDLC frame and compare the determined FCS value against the extracted unscrambled FCS field. The integrity of the HDLC frame can be determined based on whether the determined FCS value matches the extracted unscrambled FCS field.

The drawings and the forgoing description gave examples of the present invention. While a demarcation between operations of elements in examples herein is provided, operations of one element may be performed by one or more other elements. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   determining a first field based on a first portion of a packet;
   scrambling the first portion of the packet;
   combining the first field with the scrambled first packet portion, wherein the first field is unscrambled;
   adjusting a rate of providing the first portion of the packet based on a first byte-stuffing prediction, wherein the first byte-stuffing prediction is to be determined based on a number of bytes that are to be added for each frame to be transmitted;
   removing frame delineation characters from a frame;
   transforming stuffed characters in the frame;
   descrambling a second portion of the frame except for at least one unscrambled field; checking the integrity of the frame based on the at least one unscrambled field; and adjusting a rate of providing a second portion of the packet based on a second byte-stuffing prediction, wherein the second byte-stuffing prediction is to be determined based on a number of bytes that are to be added for each frame to be transmitted.

2. The method of claim 1, further comprising:
   byte stuffing the combination of the first field and the scrambled first packet portion; and
   indicating an end of a frame including the byte stuffed combination of the first field and the scrambled first packet portion.

3. The method of claim 1, further comprising determining the first byte-stuffing prediction based on the scrambled first packet portion.

4. The method of claim 3, wherein the predicting includes counting characters to be stuffed.

5. The method of claim 1, wherein the first field comprises an FCS (Frame Check Sequence) field.

6. The method of claim 1, further comprising:
   combining a second field with the scrambled first packet portion, wherein the second field is unscrambled and wherein the second field comprises an HDLC (High-level Data Link Control) frame header.

7. The method of claim 1, wherein the first portion comprises IP (Internet Protocol) packets.

8. The method of claim 1, wherein the first portion comprises Ethernet frames.

9. The method of claim 1, further comprising determining the byte-stuffing prediction based on a scrambled portion of the packet.

10. The method of claim 1, wherein the checking further comprises:
    extracting the at least one unscrambled field;
    determining a field based on the descrambled second portion; and
    comparing one of the at least one unscrambled field with the determined field.

11. The method of claim 1, wherein the at least one unscrambled field comprises an FCS field.

12. The method of claim 1, wherein the at least one unscrambled field comprises an HDLC header.

13. An apparatus comprising:
    a field calculator to determine a first field based on a first portion of a packet;
    a scrambler to scramble the first portion of the packet;
    a field inserter to combine the first field with the scrambled first packet portion;
    a frame delineator to remove frame delineation characters from a frame;
    a byte de-stuffer to transform stuffed characters in the frame;
    a de-scrambler to descramble a second portion of the frame except for at least one unscrambled field; and
    a field checker to check the integrity of the frame based on the at least one unscrambled field, wherein a source of the second portion of the frame packet is to adjust a rate of providing the second portion of the packet based on a second byte stuffing prediction,
    wherein the second byte stuffing prediction is to be determined based on a number of bytes that are to be added for each frame,
    wherein the first field is unscrambled, wherein a source of the portion of the packet is to
    adjust a rate of providing the portion of the packet based on a first byte stuffing prediction, wherein the first byte-stuffing prediction is to be determined based on a number of bytes that are to be added for each frame.

14. The apparatus of claim 13 further comprising:
    a byte stuffer to byte stuff the combination of the first field and the scrambled first packet portion; and
    a flag inserter to indicate an end of a frame that includes the combination of the byte stuffed first field and the scrambled first packet portion.

15. The apparatus of claim 13 further comprising a byte-stuffing predictor to determine the first byte stuffing prediction based on the scrambled first packet portion and to provide the prediction to the source of the first portion of the packet.

16. The apparatus of claim 13, wherein the first field comprises an FCS field.

17. The apparatus of claim 13, wherein the field inserter is further to combine a second field with the scrambled first packet portion, wherein the second field is unscrambled and comprises an HDLC frame header.

18. The apparatus of claim 13, wherein the field checker is configured to:
    determine a field based on the descrambled second portion; and
    compare one of the at least one unscrambled field with the determined field.

19. The apparatus of claim 13, further comprising a field extractor to extract the at least one unscrambled field from the frame.

20. The apparatus of claim 13, wherein the at least one unscrambled field comprises an FCS field.

21. The apparatus of claim 13, wherein the at least one unscrambled field comprises an HDLC header.

22. A system comprising:
a cross connect;
a first line card, the first line card capable of intercommunicating with the cross connect and comprising:
  a field calculator to determine a first field based on a portion of a packet,
  a scrambler to scramble the portion of the packet,
  a field inserter to combine the first field with the scrambled packet portion, wherein the first field is unscrambled;
  a frame delineator to remove frame delineation characters from a frame;
  a byte de-stuffer to transform stuffed characters in the frame;
  a de-scrambler to descramble a second portion of the frame except for at least one unscrambled field; and
a second line card capable of intercommunicating with the cross connect, wherein the first line card is to adjust a rate of providing the portion of the packet based on a byte stuffing prediction, wherein the byte-stuffing prediction is to be determined based on a number of bytes that are to be added for each frame.

23. The system of claim 22, wherein the second line card is capable of providing a line interface for a Fibre Channel compatible network.

24. The system of claim 22, wherein the second line card is capable of providing a line interface for an Ethernet compatible network.

25. The system of claim 22, wherein the second line card is capable of performing add-drop multiplexing.

26. The system of claim 22, wherein the first line card further comprises a byte-stuffing predictor to determine the byte-stuffing prediction based on the scrambled packet portion and to provide the prediction to the source of the portion of the packet.

27. The apparatus of claim 13, further comprising a byte-stuffing predictor to determine the byte stuffing prediction based on a scrambled packet portion and to provide the prediction to the source.

* * * * *

UNITED STATES PATENT AND TRADEMARK OFFICE
CERTIFICATE OF CORRECTION

PATENT NO. : 8,031,695 B2  
APPLICATION NO. : 10/839529  
DATED : October 4, 2011  
INVENTOR(S) : Eduard Lecha It is certified that error appears in the above-identified patent and that said Letters Patent is hereby corrected as shown below:

In column 8, line 29, in Claim 13, after "frame" delete "packet".

Signed and Sealed this  
Tenth Day of January, 2012

David J. Kappos  
*Director of the United States Patent and Trademark Office*